(No Model.)
J. B. UPTON.
BRAKE MECHANISM FOR VEHICLES.
No. 489,839. Patented Jan. 10, 1893.
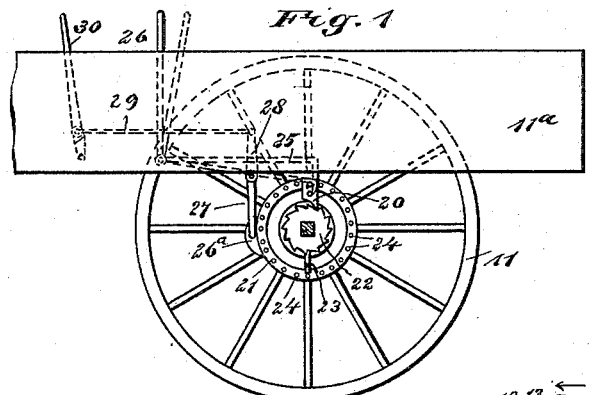
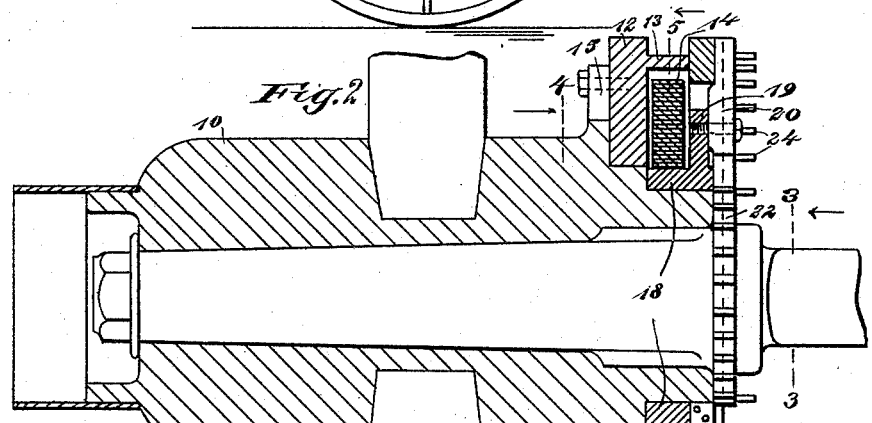
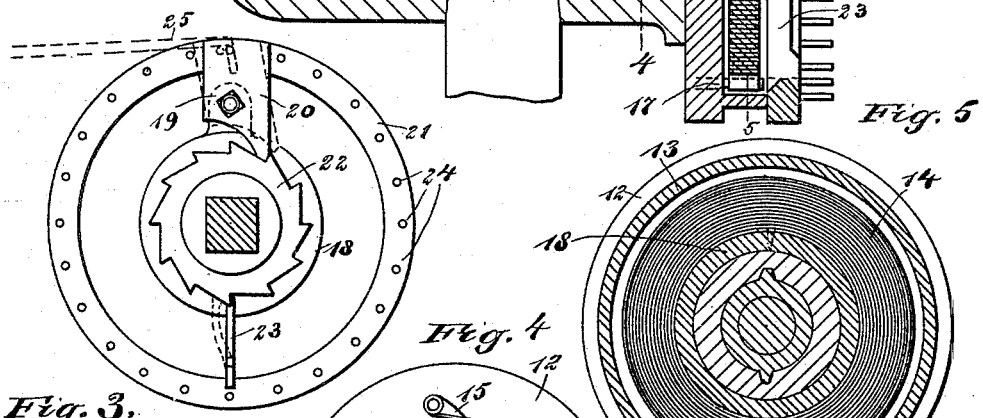
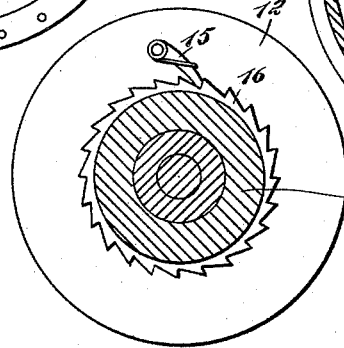
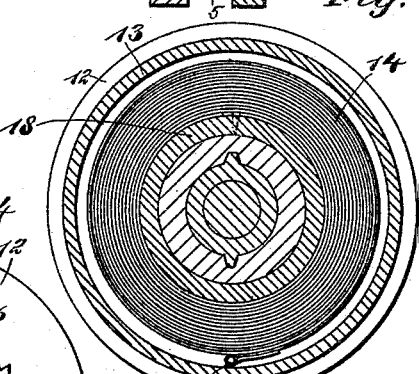
WITNESSES:
INVENTOR:
J. B. Upton
BY Munn & Co.
ATTORNEYS.

UNITED STATES PATENT OFFICE.

JAMES B. UPTON, OF COALFIELD, TENNESSEE.

BRAKE MECHANISM FOR VEHICLES.

SPECIFICATION forming part of Letters Patent No. 489,839, dated January 10, 1893.

Application filed April 6, 1892. Serial No. 428,002. (No model.)

*To all whom it may concern:*

Be it known that I, JAMES B. UPTON, of Coalfield, in the county of Morgan and State of Tennessee, have invented a new and Improved Brake Mechanism, of which the following is a full, clear, and exact description.

My invention relates to improvements in vehicle brakes, and the object of my invention is to produce a spring attachment and connect it with a vehicle in such a way that when the vehicle brake is applied when going down hill the spring will be wound up and held wound, and also to provide means for releasing the spring at any necessary time, so that the power stored therein can be utilized for starting the vehicle or helping to carry it over a hill.

To this end my invention consists in certain features of construction and combinations of the same, as will be fully described hereinafter and then pointed out in the claims.

Reference is to be had to the accompanying drawings forming a part of this specification, in which similar figures of reference indicate corresponding parts in all the views.

Figure 1 is a sectional side elevation of the apparatus as applied to a vehicle; Fig. 2 is an enlarged longitudinal section of the hub showing the operating mechanism mounted thereon; Fig. 3 is a cross section on the line 3—3 in Fig. 2 looking in the direction of the arrow; Fig. 4 is a cross section on the line 4—4 in Fig. 2; and Fig. 5 is a cross section on the line 5—5 in the same figure.

The wheel hub 10 is produced on the wheel 11 of the vehicle 11ᵃ in the usual way and runs on the vehicle axle in the ordinary manner. Journaled on the hub near its inner end is a drum 12, having on its inner side an annular flange 13, which forms a box adapted to hold within it the main spring 14. On the outer side of the drum 12 is pivoted a pawl 15 which is adapted to engage the teeth of a ratchet wheel 16 which is produced on the hub, and the ratchet connection is such that when the drum 12 is turned forward it will carry the hub with it.

The main spring 14, which is held within the flange 13 of the drum, has one end secured to the drum as shown at 17 in Fig. 2, and its inner end is secured to a sleeve 18 which is journaled on the wheel hub and which has on one side an outwardly extending lug 19 to which is pivoted a pawl 20, the pawl being also secured at its outer end to the rim of a pin wheel 21.

The pawl 20 is held to engage a ratchet wheel 22 which is secured to the inner end of the hub, and the teeth of the ratchet wheel have the opposite inclination to the teeth of the ratchet wheel 16. The sleeve 18 is also connected with the rim of the pin wheel 21 by a strong flat spring 23, this spring being placed diametrically opposite the lug 19, as shown in Fig. 3, and the spring and pawl 20 normally hold the wheel 21 in engagement with the hub and the ratchet wheel 22.

On the inner side of the wheel 21 and arranged entirely around it are inwardly projecting pins 24 which are adapted to engage a hook 25 which is secured to a lever 26 extending upward within the vehicle body and in a place where it may be conveniently reached. I have shown a simple lever 26 connected with the hook 25 simply to illustrate an operative connection with the hook, but any sort of lever mechanism may be used for operating it.

The drum 12 is adapted to be engaged by a brake 26ᵃ carried by a brake rod 27, and this connects with a crank 28, connecting rod 29 and operating lever 30, by means of which the brake may be applied or released; any known form of brake may be substituted for that shown, as the brake itself forms no part of the invention.

The operation of the device is as follows: When the wheel is turned the whole apparatus will normally revolve with the hub, but when the brake is applied to the drum 12, the drum is stopped but the hub keeps on turning, and by means of the pin wheel 21, the ratchet wheel 22 and the sleeve 18, the spring is wound up tightly, and after it is wound the brake will have the effect that it would have if applied to the rim of the wheel 11. The pawl 20 holds the spring from unwinding. When the spring is to be utilized for turning the wheel, the operator tilts the lever 26, so as to throw the hook 25 into engagement with one of the pins 24 of the pin wheel. The downward and forward movement of the hook causes the spring 23 to buckle, as shown by dotted lines in Fig. 3, and throw the pawl 20 out of engagement with the ratchet wheel 22. The spring 14 is then permitted to unwind, and as it does so it revolves the drum 12, which by means of the pawl 15 and ratchet wheel 16, turns the hub 10 and the wheel 11, thus propelling the vehicle.

I have shown a particular form of ratchet mechanism for operating the hub by the movement of the spring, but I do not confine myself to the precise construction shown, as it is obvious that it may be departed from without altering the principle of my invention.

Having thus described my invention, I claim as new, and desire to secure by Letters Patent:—

1. The combination with a vehicle hub, of a drum journaled thereon and having a ratchet connection therewith, a sleeve journaled independently of the drum, a spring secured to the sleeve and drum, and a ratchet mechanism for holding and releasing the spring, substantially as described.

2. The combination with the vehicle hub, of the brake drum journaled thereon and having a ratchet connection therewith, a sleeve journaled on the hub adjacent to the drum, a main spring having one end secured to the sleeve and the opposite end to the drum, and a ratchet mechanism for locking and releasing the sleeve, substantially as described.

3. The combination with the hub, of the brake drum journaled thereon and having a ratchet connection therewith, a sleeve journaled on the hub adjacent to the drum, a main spring coiled upon the sleeve and secured to the sleeve and drum, the pin wheel having a ratchet connection with the sleeve and hub, and a releasing hook to engage the pin wheel, substantially as described.

JAMES B. UPTON.

Witnesses:
GEO. W. WAIT,
R. G. HAIL.